United States Patent Office 2,745,870
Patented May 15, 1956

2,745,870

POLYALKOXY AND POLYALKANOYLOXY DERIVATIVES OF α,β-DIPHENYLALKANONES AND THEIR PREPARATION

Kurt J. Rorig, Chicago, Ill., assignor to G. D. Searle & Co., Skokie, Ill., a corporation of Delaware No Drawing. Application November 14, 1952,
Serial No. 320,615

11 Claims. (Cl. 260—479)

The present invention relates to novel organic chemical compounds and particularly to α,β-dihpenylalkanones substituted on each of the phenyl nuclei by at least on alkoxy or alkanoyloxy radical. The ketones which constitute my invention can be represented by the general structural formula

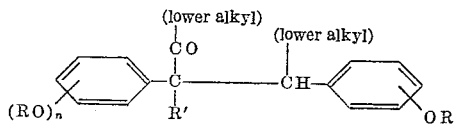

wherein R is a member of the class consisting of lower alkyl and lower alkylcarbonyl radicals, R' is a member of the class consisting of hydrogen and lower alkyl radicals and $n$ is a positive integer smaller than 3.

In the foregoing structural formula R can represent a lower alkyl group such as methyl, ethyl, as well as straight and branched chain propyl, butyl, amyl and hexyl; and such lower alkylcarbonyl radicals as acetyl, propionyl, butyryl and the like. The radical R' can be hydrogen or a lower alkyl radical of the foregoing type.

The ketones of my invention can be obtained by a number of methods. Thus an amide of the type

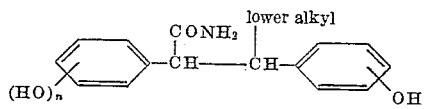

described in my application Serial Number 167,265, filed June 9, 1950, now abandoned, and my application Serial Number 228,999, filed May 29, 1951, which was issued on January 19, 1954, as U. S. Patent No. 2,666,789, can be hydrolyzed with strong alkali to form the acid of the type

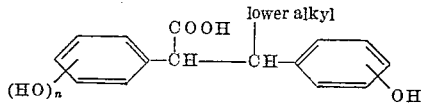

The free hydroxyl group can then be protected by esterification or etherification, and the acid group converted to an acyl chloride group of the type

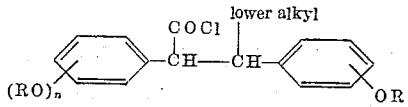

wherein R is defined as hereinabove. This acid chloride is then reacted with an organometallic compound, such as a dialkylcadmium to produce

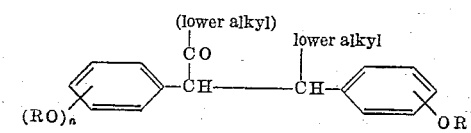

Another useful method is illustrated by the following procedure. An acrylonitrile of the type

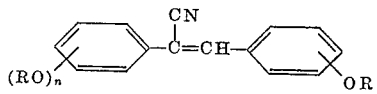

R, being a lower alkyl radical, is treated with an organometallic compound such as R"MgBr to produce an addition compound of the type

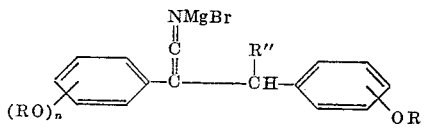

R" being a lower alkyl radical. The latter is then reacted with an alkyl halide, e. g., R'I, to form an alkanonitrile of the type

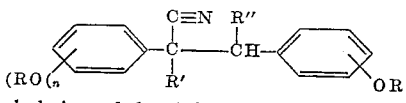

all symbols being of the definition as hereinabove.

This nitrile is finally treated with an alkylmetallo compound, e. g., alkylmagnesium bromide, to form the 2-alkanone of the type.

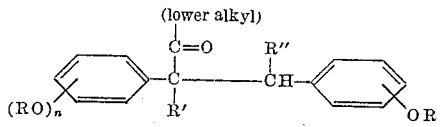

If conditions used in the earlier steps are too strong, an undesired hydrolysis of the R alkyl groups may occur and in that case it may be necessary to realkylate.

The present invention provides valuable new organic chemicals with potent physiological action. These ketones have shown a potent antagonism to the hypertensive effects of desoxycorticosterone. They are also estrogens. An additional interesting physiological property is that of antagonism of alloxan diabetes. Besides being valuable as blood pressure reducing and hormonal agents, the ketones described are also valuable intermediates in organic synthesis. My copending application, Serial Number 296,761, filed July 1, 1952, now abandoned, shows their utilization in preparation of tertiary carbinols by Grignard reaction of the carbonyl radical with lower alkyl magnesium halides. The resulting carbinols provide potent adrenal and sex steroids. Also, by dealkylation of the ether radicals, valuable hydroxyphenyl compounds are obtained, which are desoxycorticosterone antagonists and estrogens.

The following examples illustrate in detail some of the compounds which comprise this invention and methods for producing same. However, this invention is not to be construed as limited in spirit or in scope thereby. It will be apparent to chemists skilled in the art that many modifications in materials and methods may be made without departing from the invention. In each of these examples temperatures are given uncorrected in degrees centigrade (° C.), relative amounts of materials in parts by weight and pressure during vacuum distillations in millimeters (mm.) of mercury.

The present application is a continuation-in-part of my copending application, Serial No. 191,493, filed October 21, 1950, now abandoned.

EXAMPLE 1

*3,4-di(p-methoxyphenyl)-2-hexanone*

A solution of 100 parts of α,β-di(p-methoxyphenyl)-valeronitrile in 700 parts of hot glacial acetic acid is treated with 570 parts of 48% hydrobromic acid and heated at refluxing temperature for 3 hours. Almost immediately after starting the reflux period, the solution becomes deep purple-blue. The color changes to reddish-purple after 10 minutes and finally light walnut-brown. The solution is then poured into 6000 parts of ice cold water. The fine, almost gelatinous, white precipitate is filtered and washed with water. After two recrystallizations from ethyl acetate, the α,β-bis(p-hydroxyphenyl)-valeramide melts at about 274 to 275° C. It has the structural formula

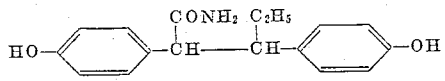

A copper vessel is charged with 115 parts of α,β-bis(p-hydroxyphenyl)valeramide, 850 parts of ethylene glycol and 96 parts of 33% aqueous sodium hydroxide. After refluxing for 24 hours the homogeneous reaction mixture is diluted with 3000 parts of water, filtered, acidified and allowed to stand overnight in the refrigerator. There is obtained by filtration crude α,β-bis(p-hydroxyphenyl)-valeric acid, melting at 237–240° C. Recrystallization from 90% acetic acid gives an analytically pure sample of the higher melting racemic isomer of α,β-bis(p-hydroxyphenyl)valeric acid, which melts at about 244–246° C.

The aqueous filtrate from which the higher melting racemate has been obtained is evaporated in vacuo and extracted with ether to recover the low-melting racemic isomer of α,β-bis(p-hydroxyphenyl)valeric acid. A sample of this isomer, recrystallized from water, melts at about 189–190° C.

A solution of 29 parts of α,β-bis(p-hydroxyphenyl)-valeric acid, M. P. 224–246° C., in 60 parts of methanol is mixed with 27 parts of dimethyl sulfate. After cooling to 5° C., a solution of 15 parts of potassium hydroxide in 35 parts of water is added all at once. After methylation ceases, the resultant mixture is diluted with water, acidified and extracted with ether. The ethereal layer is extracted with 5% aqueous sodium hydroxide to obtain the α,β-di(p-anisyl)valeric acid free of a small quantity of byproduct methyl ester of the desired acid. The alkaline extract is acidified and again extracted with ether. The ether extract is dried over anhydrous potassium carbonate and evaporated to give a racemic α,β-di(p-methoxyphenyl)valeric acid which melts at about 183–184° C. after recrystallization from ethanol.

To a suspension of 15.5 parts of α,β-di(p-methoxyphenyl)valeric acid in 300 parts of absolute ether, 16.5 parts of thionyl chloride and 0.1 part of pyridine are added. After refluxing for 90 minutes the solution is filtered and evaporated to dryness at reduced pressure. The α,β-di(p-methoxyphenyl)valeryl chloride, melting at 137–138° C., dissolved in 45 parts of warm benzene, is added as rapidly as possible to a boiling solution of 28 parts of freshly prepared dimethylcadmium in 200 parts of benzene. When the mildly exothermic reaction subsides, external heating is utilized to maintain the reaction mixture at refluxing temperature for 75 minutes. The mixture is then chilled in an ice bath and carefully decomposed with 100 parts of 10% hydrochloric acid. The aqueous layer is separated and extracted with benzene. The benzene solutions are combined, dried and evaporated to dryness in vacuo. The 3,4-di(p-methoxyphenyl)-2-hexanone is recrystallized from ethanol and melts at about 141–142° C. This compound has the structural formula

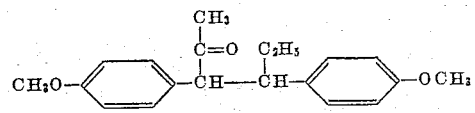

Treatment with semicarbazide hydrochloride and sodium acetate yields the semicarbazone of this higher melting, racemic 3,4-di(p-methoxyphenyl)-2-hexanone melting at about 211–212° C.

EXAMPLE 2

3,4-di(p-anisyl)-2-hexanone

To 59 parts of α,β-di(p-methoxyphenyl)valeronitrile, melting at 132–133° C., in 1500 parts of dry thiophene-free benzene are added 290 parts of a 2.25 normal ethereal solution of methyl magnesium bromide and the mixture is stirred at room temperature for 2 hours, refluxed for 3.5 hours and decomposed with aqueous hydrogen chloride. The benzene layer is separated and concentrated to dryness in vacuo. The partly solidified residue is triturated with 140 parts of absolute ether to leave as a residue the higher melting racemic 3,4-di(p-methoxyphenyl)-2-hexanone melting at about 141–142° C. The ethereal triturate, upon storing at 0° C., deposits the crude lower-melting racemic 3,4-di(p-methoxyphenyl) - 2 - hexanone which, recrystallized from ethanol, melts at 99.0–100.5° C.

EXAMPLE 3

3,4-bis(p-acetoxyphenyl)-2-hexanone

A mixture of 10 parts of α,β-bis(p-hydroxyphenyl)-valeric acid, 65 parts of pyridine, and 38 parts of acetic anhydride is heated for 2.5 hours on a steam bath. The excess acetic anhydride is decomposed with water and the mixture diluted with 500 parts of water to precipitate the α,β-bis(p-acetoxyphenyl)valeric acid melting at about 217–219° C.

To a suspension of 14 parts of α,β-bis(p-acetoxyphenyl)valeric acid in 280 parts of absolute ether, 11 parts of thionyl chloride and 0.1 part of pyridine are added. After refluxing for 5 hours the solution is filtered and evaporated to dryness at reduced pressure. The α,β-bis-(p-acetoxyphenyl)valeryl chloride, dissolved in 120 parts of warm benzene, is added as rapidly as possible to a solution of 28 parts of freshly prepared dimethylcadmium in 260 parts of benzene. When the mildly exothermic reaction subsides, external heating is used to maintain the reaction temperature at refluxing range for 3 hours. The mixture is then chilled in an ice bath and carefully decomposed with 100 parts of 10% hydrochloric acid. The aqueous layer is separated and extracted with benzene. The benzene solutions are combined, dried and evaporated to dryness in vacuo. The 3,4-bis(p-acetoxyphenyl)-2-hexanone is recrystallized from ethanol and melts at about 143–144° C. It has the structural formula

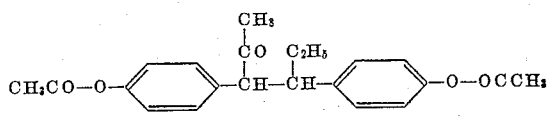

EXAMPLE 4

3,4-bis(p-hydroxyphenyl)-2-hexanone

To one part of 3,4-bis(p-acetoxyphenyl)-2-hexanone dissolved in 40 parts of methanol are added two parts of potassium bicarbonate in 13 parts of water. The mixture is refluxed for 2.5 hours on the steam bath, diluted with 140 parts of water, filtered and acidified. The white, powdery precipitate is filtered off and washed with water. It consists of 3,4-bis(p-hydroxyphenyl)-2-hexanone melting at about 220–221.5° C.

EXAMPLE 5

3,4-di(p-methoxyphenyl)-3-methyl-2-hexanone

To a solution of 133 parts of ethyl magnesium bromide in 640 parts of absolute ether are added portionwise in one-half hour 76 parts of α,β-bis(p-methoxyphenyl)acrylonitrile. After refluxing for 4 hours there are added dropwise in 5 minutes 80 parts of methyl iodide. The mixture is refluxed for one hour and then decomposed with ice and hydrochloric acid. The ethereal layer is separated, dried over anhydrous potassium carbonate and distilled to yield the mixture of two racemic isomers of α,β-di(p-methoxyphenyl)-α-methylvaleronitrile. This is a viscous white oil boiling at about 162–165° C. at 0.003 mm. pressure.

A solution of 40 parts of methyl magnesium bromide in 78 parts of ether is added to 46 parts of the α,β-di(p-methoxyphenyl)-α-methylvaleronitrile in 216 parts of dry xylene. The mixture is stirred and heated to remove 36 parts of ether by distillation. It is then refluxed for 24 hours, the internal temperature being about 126° C. The Grignard complex of the product is decomposed with ice and hydrochloric acid. This acidic mixture is refluxed for one hour to hydrolyze any remaining imino compound. The organic layer is then separated, dried and distilled to give the product, a mixture of the two racemic isomers of 3,4-di(p-methoxyphenyl)-3-methyl-2-hexanone, boiling at about 166-167° C. at 0.003 mm. pressure, which has the structural formula

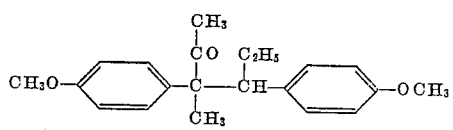

Treatment with semicarbazide hydrochloride and sodium acetate yields a mixture of the racemic semicarbazones. By fractional crystallization from dilute ethanol the higher melting racemic semicarbazone of 3,4-di(p-methoxyphenyl)-3-methyl-2-hexanone is obtained, melting at about 223–225° C.

EXAMPLE 6

*3,4-di(p-hydroxyphenyl)-3-methyl-2-hexanone*

A solution of 93 parts of 3,4-di(p-methoxyphenyl)-3-methyl-2-hexanone and 550 parts of freshly distilled pyridine hydrochloride is heated at reflux temperature for 30 minutes, cooled, diluted with 4000 parts of water, chilled and extracted with ether. The ether extract is dried over anhydrous calcium sulfate, filtered and evaporated to leave an oily residue. The latter is taken up in 2200 parts of 2% aqueous sodium hydroxide solution at a temperature of 10–18° C., washed with ether, acidified with dilute hydrochloric acid and extracted with ether. The ether extract is washed with saturated aqueous sodium bicarbonate solution, dried over anhydrous calcium sulfate, stirred with charcoal, filtered and evaporated. The 3,4-di(p-hydroxyphenyl)-3-methyl-2-hexanone is then obtained by vacuum distillation at about 180–185° C. and 0.2 mm. pressure as a viscous yellow oil.

EXAMPLE 7

*3,4-di(p-methoxyphenyl)-3-ethyl-2-heptanone*

A solution of 87 parts of methyl magnesium bromide in 170 parts of ether is added to 100 parts of α,β-di(p-anisyl)-α-ethylhexanonitrile (cf. method of E. Kohler, Am. Chem. Journal, 35, 403, 1906) in 470 parts of dry xylene, with stirring. 80 parts of the ether are distilled off. The mixture is heated at reflux temperature for 24 hours. The resulting Grignard complex is decomposed with ice and hydrochloric acid and then heated at refluxing temperature for one hour. The organic layer is separated, dried and submitted to high vacuum distillation at about 175–185° C. and 0.2 mm. pressure. The resulting oil consists of a mixture of the two racemic isomers of 3,4-di(p-methoxyphenyl)-3-ethyl-2-heptanone, which has an infrared maximum at about 5.9 microns. The compound has the structural formula

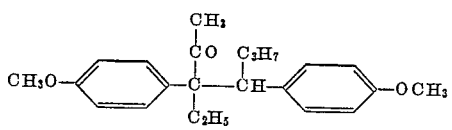

EXAMPLE 8

*3-(m,p-dimethoxyphenyl)-4-(p-methoxyphenyl)-3-methyl-2-hexanone*

295 parts of α-(m,p-dimethoxyphenyl)-β-(p-methoxyphenyl)acrylonitrile are dissolved in 2000 parts of benzene at 65° C. and treated in the course of 15 minutes with 570 parts of a 1.4 normal ethereal ethyl magnesium bromide solution and then heated at reflux temperature for 30 minutes. In the course of 15 minutes, 2400 parts of methyl iodide are added and refluxing is continued for 6 hours. The reaction mixture is decomposed with dilute hydrochloric acid and filtered to remove the small amount of 1-(p-methoxyphenyl)-2-(m,p-dimethoxyphenyl)-1-penten-3-one. The filtrate is evaporated and the residue crystallized from ethanol. Crystals are obtained melting at about 95–97° C. The ethanolic mother liquor is evaporated and distilled at about 0.5 mm. pressure and 192–197° C. to yield the lower melting racemic isomer of 2-methyl-2-(m,p-dimethoxyphenyl)-3-(p-methoxyphenyl)valeronitrile.

Under a nitrogen atmosphere a solution of 340 parts of the higher melting racemic isomer in 3900 parts of xylene is stirred and treated in the course of 5 minutes with 1300 parts of a 2.25 normal ethereal methyl magnesium bromide solution at reflux temperature. An immediate yellow flocculent precipitate is formed, which later turns greenish and crystalline. Stirring and heating at reflux temperature is continued for 4 hours and the resulting grayish white pasty mixture is decomposed with a large excess of aqueous ammonium chloride solution. The organic layer is separated and the aqueous phase is extracted several times with ether. The combined organic layers are dried over sodium sulfate, filtered and solvent stripped in vacuo to yield the 3-methyl-3-(m,p-dimethoxyphenyl)-4-(p-methoxyphenyl)-2-hexanone as a viscous golden oil which does not readily crystallize. It is distilled at about 180–183° C. and 0.2 mm. pressure, and shows a strong infrared absorption at 5.89 microns. The compound has the structural formula

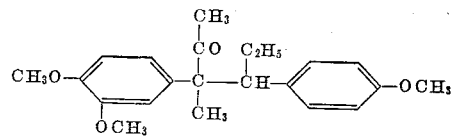

I claim:

1. The compounds of the structural formula

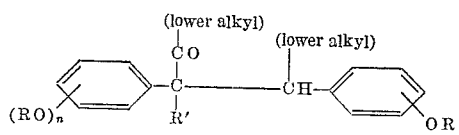

wherein R is a member of the class consisting of lower alkyl and (lower alkyl)—CO— radicals, R' is a member of the class consisting of hydrogen and lower alkyl radicals, and n is a positive integer smaller than 3.

2. The compounds of the structural formula

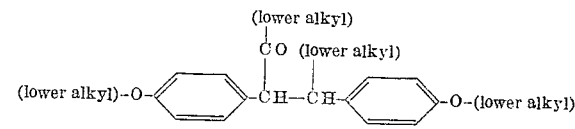

3. The compounds of the structural formula

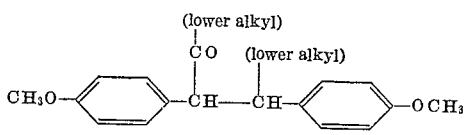

4.

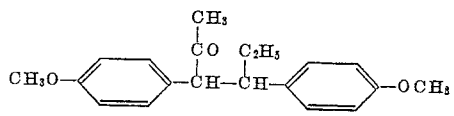

5. The compounds of the structural formula

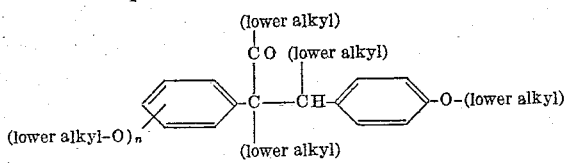

wherein *n* is a positive integer less than 3.

6. The compounds of the structural formula

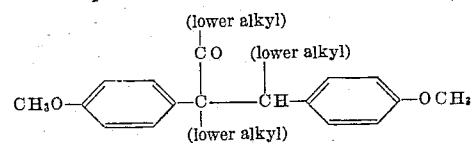

7.

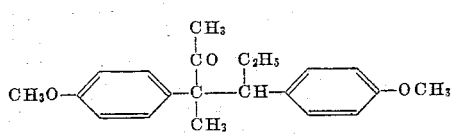

8. The compounds of the structural formula

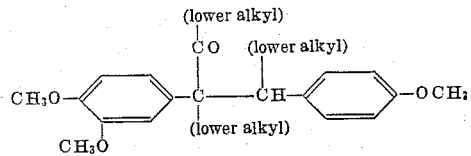

9.

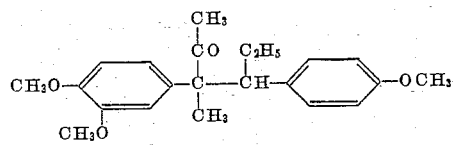

10. The compounds of the structural formula

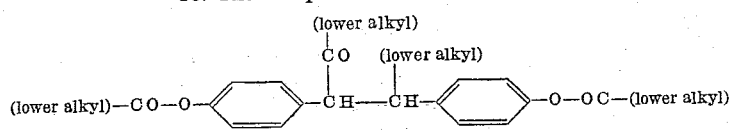

11. The compounds of the structural formula

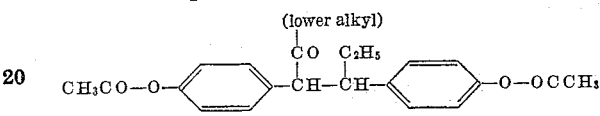

References Cited in the file of this patent
UNITED STATES PATENTS 2,281,956    Salzer ------------------ May 5, 1942
2,455,535    Tallman ---------------- Dec. 7, 1948

OTHER REFERENCES

Kohler: Am. Chem. Journal, vol. 35 (1906), pp. 386–404.

Mills et al.: J. Chem. Soc., vol. 27 (1925), pp. 2475–2478.

Levy et al.: "Bull. Soc. Chim.," Series 4, vol. 45 (1929), pp. 941–950.

Baker: J. Am. Chem. Soc., vol. 65 (1943), pp. 1572–1579.

Satriand et al.: Jour. Am. Chem. Soc., vol. 73 (1951), pp. 866–7.